3,025,265
NEW POLYMERIZATION PRODUCTS AND PROCESS FOR THEIR MANUFACTURE

Arthur Maeder, Basel, Switzerland, assignor to Ciba Limited, Basel, Switzerland
No Drawing. Filed Aug. 6, 1956, Ser. No. 602,429
Claims priority, application Switzerland Aug. 16, 1955
17 Claims. (Cl. 260—63)

This invention relates to copolymers which contain as structural elements a hydrazide or functionally converted hydrazide of a copolymerizable unsaturated acid and another copolymerizable unsaturated compound. The term "structural elements" denotes the monomeric unsaturated compounds from which the copolymers can be regarded as having been made. The production of polymeric compounds containing hydrazide groups cannot be carried out by the polymerization or copolymerization of monomeric hydrazides owing to the occurrence of cross-linking reactions. The products of the invention are therefore made by the action of an agent yielding hydrazine upon copolymers which contain atomic groupings capable of reacting with such agents, such as acid, acid halide or especially ester groups, and, if desired, by converting the hydrazide groups so formed, for example, with carbonyl compounds.

As starting materials for the process of the invention there may be used any desired copolymers, for example, binary or ternary copolymers or copolymers of more complex structure, provided that they contain an atomic grouping capable of reacting with an agent yielding hydrazine. As components for preparing these initial copolymers, which contain an atomic grouping capable of reacting with hydrazine, there may be mentioned crotonic acid, α-chloracrylic acid and especially acrylic acid, and acid chlorides or esters thereof, and also methacrylic acid or methacrylic acid chloride. There are advantageously used acrylic acid esters of alcohols of low molecular weight, such as methyl, ethyl, propyl, isopropyl, butyl or secondary butyl esters. As further components, which can be used to form the initial copolymers, there may be used, for example, vinyl esters of organic acids, for example, vinyl acetate, vinyl formate, vinyl butyrate, vinyl benzoate or vinyl alkyl ketones, vinyl halides such as vinyl chloride, vinyl fluoride or vinylidene chloride, vinyl-aryl-compounds such as styrene or substituted styrenes, and also esters of methacrylic acid, such as methyl or ethyl methacrylate, or derivatives of acrylic acid free from ester groups, such as acrylonitrile, acrylic acid amide and derivatives thereof substituted at the amide nitrogen atom. There may also be used polymerizable olefines, such as isobutylene, butadiene or 2-chlorobutadiene, or heterocyclic compounds containing at least one vinyl group such as the various vinyl-pyridines.

The various copolymers serving as starting materials in the process of the invention are either known or can be made by methods in themselves known by polymerization in solution, in bulk or in emulsion, and advantageously under the action of a polymerization catalyst and any of the usual regulating or activating additions.

In order to make polymers containing hydrazide groups in accordance with the invention, it is also possible to use homopolymers of acrylic acid esters, provided that only a part of the ester groups in the hydrazide groups undergo conversion during the reaction with the agent yielding hydrazine. Such homopolymers are advantageously derived from acrylic acid esters of alcohols of low molecular weight, for example, from acrylic acid methyl ester, ethyl ester, propyl ester, isopropyl ester, n-butyl ester or secondary butyl ester.

As agents yielding hydrazine there may be used more especially hydrazine or hydrazine hydrate. The relative proportions of the initial polymer and the agent yielding hydrazine, which are to be used in the process of the invention, may vary within wide limits and depend on the quantity of hydrazide groups which is to be introduced. The other reaction conditions, such as temperature, duration of the reaction and the use of solvents, are suitably chosen for each particular case. They depend largely on the ease with which the reaction can be carried out. Those skilled in the art will easily be able to determine the most favorable conditions by preliminary tests. In general it is desirable to use as mild conditions as possible, because the reaction products containing hydrazide groups can easily undergo further reaction with cross-linking.

The properties of the polymers containing hydrazide groups are largely influenced by the nature of the other structural element or elements present in the polymer. The products may be of a soft-rubber-like to brittle hard character. A product, which has been obtained by reacting poly-n-butyl acrylate, and of which 50 percent of the ester groups have been replaced by hydrazide groups, can be defined as a copolymer which contains as structural elements 50 percent of acrylic acid hydrazide and 50 percent of acrylic acid n-butyl ester. A product, which has been obtained from an initial copolymer of 10 percent of styrene with 90 percent of n-butyl acrylate by replacing 50 percent of the ester groups of the copolymer by hydrazide groups, can be defined as a copolymer which contains as structural elements 10 percent of styrene, 45 percent of n-butyl acrylate and 45 percent of acrylic acid hydrazide.

As stated above, the invention includes not only polymers containing hydrazide groups, but also those in which the hydrazide groups are converted. For this further reaction there are used principally carbonyl compounds, that is to say, aldehydes or ketones. If it is desired to form a hydrazone without further cross-linking, a saturated monoketone or monoaldehyde containing at least two carbon atoms may be used. As such ketones or aldehydes there may be used, for example, aliphatic ketones or aldehydes, such as acetone, ethyl methyl ketone, diisopropyl ketone, isobutyl methyl ketone, di-n-butyl ketone, dodecylmethyl ketone, octadecyl isobutyl ketone, acetaldehyde or propionaldehyde, or cycloaliphatic ketones such as cyclohexanone, or camphor, or aryl alkyl ketones, such as acetophenone, or compounds such as benzaldehyde or furfuraldehyde, or finally aminoketones or amino-aldehydes, such as para-acetylaminobenzaldehyde, diacetone-amine, N-methyl - diacetone-amine, aminomethylphenyl ketone, or oxy-ketones and oxy-aldehydes, such as glucose, fructose, ortho-oxyacetophenone, salicylaldehyde or halogenated aldehydes and ketones such as chloral or chlorinated acetones. Depending on the choice of the starting materials there are obtained soft to tough and hard resins.

If the hydrazone formation is to be accompanied by simultaneous cross-linking, di- or poly-ketones, di- or poly-aldehydes, aldehyde-ketones or unsaturated aldehydes or ketones are used. Among these compounds there may be mentioned acrolein, crotonaldehyde, glyoxal, succinic dialdehyde, acetyl-acetone, acetonyl-acetone, phorone, polyvinyl methyl ketone, acetone-dicarboxylic acid ester, and also copolymers of vinyl alkyl ketones or acrolein with other polymerizable compounds. Among the products which react accompanied by cross-linking there must be included formaldehyde and compounds which liberate formaldehyde or react similarly to formaldehyde. Among the latter compounds there may be mentioned para-formaldehyde, hexa-methylene tetramine, and also dimethylol-urea, methylol-aminotriazines such as methylol-melamines and ethers thereof with alcohols of low molecular weight and methylol-compounds of acetylene-diurea or ethylene-diurea or of uron.

Other compounds which are suitable for bringing about cross-linking reactions with the copolymers containing hydrazide groups in accordance with the invention, are di- or poly-isocyanates, di- or poly-acrylamides, such as methylene-bis-acrylamide, methylol-melamines which are acrylamidated or esterified with acrylic acid, and also tri-acryl-formal, oxalic acid esters, epoxide resins, unsaturated ester-resins, di- or poly-olefines such as divinyl-benzene, and finally di- or poly-carboxylic acids, for example, polyacrylic acid. Such cross-linking reactions can be carried out not only with the copolymers containing hydrazide groups, but with particular advantage with the non-cross-linked hydrazones.

The cross-linking reactions may be carried out in substance or in the presence of a shaped or unshaped carrier material and in the presence or absence of a solvent. They can be accelerated by heat and the addition of a catalyst. As catalysts there may be mentioned acids, such as formic acid or acetic acid, and mineral acids, and also potentialy acid compounds such as ammonium chloride. In carrying out such reactions with polyfunctional unsaturated compounds there is advantageously used a small proportion of a basic catalyst, such as an alkali metal hydroxide, an amine or quaternary ammonium base.

From the foregoing it will be understood that there is a wide range of possible variations for reactions with copolymers containing hydrazide groups. In view of the fact that the copolymers containing hydrazide groups can themselves vary considerably in their properties, it will be understood that by means of suitable combinations it is possible to produce products suitable for a very wide variety of purposes. Accordingly the products of the invention can be used in all branches of industry. Suitable products can be used as raw materials for lacquers either alone or in admixture with other lacquer resins, especially with ethers of urea-formaldehyde or melamine-formaldehyde condensation products. Thus products which are soluble or easily dispersible in water can be used as emulsifying, sizing or dressing agents. Hydrazones, which are derived from pharmaceuticaly interesting aldehydes or ketones, can be used as medicaments. Compounds containing a large number of chlorine atoms are suitable as flame-proofing agents. Compounds which contain quaternary ammonium groups or amine-salt groups are useful as agents for reducing static electric charges in artificial fibers or as agents for improving the properties of wet fastness of dyeings produced with substantive dyestuffs. Many products are quite generally suitable as finishing agents in the textile, leather and paper industries, for example, as impregnating, coating or adhesive agents, and especialy as binding agents for pigments. In general finishes produced with the products of the invention have good wearing properties.

The following examples illustrate the invention, the parts and percentages being by weight, unless otherwise stated, and the relationship of parts by weight to parts by volume being the same as that of the kilogram to the liter:

Example 1

1446.6 parts of a solution of 48.65% strength in n-butanol of poly-n-butyl acrylate, which has been obtained in known manner by polymerizing n-butyl acrylate in butanol for several hours at a raised temperature in the presence of benzoyl peroxide, are mixed, while stirring, with 415.8 parts of hydrazine hydrate of 99.2 percent purity (the molecular ratio of polybutyl acrylate to hydrazine hydrate being 1:1.5), and heated under nitrogen for one hour at 105° C. and then for 3 hours at 98–100° C. The initially clear resin solution becomes turbid and finally changes into a jelly-like mass. The stiff gel obtained by cooling is dispersed with 1500 parts by volume of methanol in a kneading apparatus and in this manner the greater part of the butanol and some water is thrown out by shrinkage. By subsequent grinding there is obtained a finely powdered reaction product suspended in methanol, and the product can best be freed from methanol by centrifuging it in a cage centrifuge having a cloth filter. In order to remove the unreacted hydrazine hydrate completely, the product is washed three times with 1500 parts by volume of methanol on each occasion and is then thoroughly centrifuged. The resulting colorless flocculent polymer is first spread out on a glass plate at the ordinary temperature and then thoroughly dried in a desiccator over calcium chloride. By analysis it has a nitrogen content of 16.0 percent from which it is evident that about 50% of the butyl acrylate units of the polymer have been converted into acrylic acid hydrazide units. This poly-n-butyl acrylate, which has been partially converted into hydrazide, is not soluble in water but swells strongly therein. However, it easily dissolves when 10% of n-butanol (calculated on the total solution) is added. Other solution promoters, such as isopropanol, n-propanol, alcohol, ethylene glycol monoethyl ether, acetone or the like may be used.

Example 2

62.5 parts of the polymeric partial hydrazide described in Example 1 are mixed with 25 parts of n-butanol and 162.5 parts of water and dissolved by heating the mixture to about 80° C. and stirring it. The solution is stable for about 24 hours, after which there is a distinct reaction between the hydrazide groups and the ester groups accompanied by cross-linking of the macromolecules and by the formation of insoluble gelled constituents. This cross-linking into the insoluble form can be accelerated by the addition of an organic or inorganic acid, such as formic acid, acetic acid, hydrochloric acid or phosphoric acid, and by heating.

Example 3

A solution freshly prepared as described in Example 2 and acidified with acetic acid, after being diluted with water to a solids content of 5%, can be used for dressing fabrics, which after being dried and subjected to a short hardening treatment (3 minutes at 130° C.) possess a water-resistant dressing which is also resistant to trichlorethylene and is fast to dry cleaning.

Films, such as can be produced by drying the solution described in Example 2 on a glass plate, are quite colorless, clear and glossy and have an excellent adhesive power.

Example 4

A solution freshly prepared in the manner described in Example 2 is diluted with water to a polymer content of 5 percent and used for dressing a cotton fabric. After drying the fabric for a short time at 60–70° C., it is immersed in a dilute aqueous solution of formaldehyde of 5 percent strength which has been acidified with acetic acid, and the fabric is then dried well. There is obtained a full dressing which has a good fastness to washing and is resistant to solvents, such as acetone, trichlorethylene and petrol.

Example 5

A rubber-like product comparable to that described in Example 1, but which is more flexible, is obtained by reacting poly-n-butyl acrylate with hydrazine hydrate in the molecular ratio 1:0.5.

12.6 parts of hydrazine hydrate of 99.2 percent purity are introduced, while stirring, into 131.5 parts of a solution of 48.65 percent strength of poly-n-butyl acrylate, the air in the reaction vessel being previously replaced by nitrogen. The mixture is heated for 1½ hours at 100–102° C. and then for 8½ hours at 85° C. The resulting viscous reaction product is pasted in a kneading apparatus first with a small amount of water and the resulting mass is then introduced into a large quantity of water, whereupon the new copolymer containing hydrazide groups separates out in fine flocks. The product is best centrifuged in a cage centrifuge having a cloth filter, then spread on to glass plates and dried in the air or in a vacuum cabinet at a temperature not exceeding 45° C. There is obtained a typical rubber-like almost colorless mass, which is no longer soluble in water, but can easily be emulsified in water by the addition of a solvent. The nitrogen content of the copolymer is 4.1 percent.

*Example 6*

A solution of the partial hydrazide of poly-n-butyl acrylate obtained as described in Example 2 and diluted with water to a solids content of 5 percent is used for dressing a cotton fabric. After drying the dressed fabric for a short time, it is immersed in a solution of 5 parts of dimethylolurea and 2 parts of acetic acid in 95 parts of water and is then centrifuged and thoroughly dried at 80–100° C. There is obtained a dressing which is very fast to washing, and is also resistant to solvents such as trichlorethylene and the like.

*Example 7*

Dressings which are very fast to washing and resistant to solvents can also be obtained by subsequently impregnating a fabric, which has been pretreated with the copolymer containing hydrazide groups as described in Example 6, either with an aqueous solution of 2 percent strength of polyacrylic acid or with an emulsion of 2 percent strength of methylolmelamine butyl ether and drying the material at 80–100° C.

*Example 8*

Separate portions of a solution of 25 percent strength of the poly-n-butylacrylate partially reacted with hydrazine and obtained as described in Example 2 are each mixed with a solution of about 10 percent strength in isopropanol of one of the diketones or unsaturated aldehydes or ketones described below, and the reaction is completed by heating the mixture for 5–10 minutes in a steam bath, the portions of the solution to which the addition is made being of about the same volume.

(a) Acetyl-acetone
(b) Acetonyl-acetone
(c) Mesityl oxide
(d) Phorone
(e) Acrolein
(f) Vinyl methyl ketone The reaction with these substances proceeds with the immediate separation of the insoluble condensation resin, which is then separated off, washed and dried, and can be used as an artificial resin composition which is highly resistant to solvents. By using a copolymer having a smaller content of hydrazide groups in these reactions there are obtained artificial resins which are highly ductile and tough.

*Example 9*

A solution of 25 percent strength of the poly-n-butylacrylate partially reacted with hydrazine as described in Example 2 is mixed in the ratio of parts by volume of about 2:1 with a solution of 10 percent strength of polyvinyl methyl ketone in acetone. An insoluble artificial resin immediately separates out in gel form, which shrinks on being heated, and is then centrifuged with acetone and washed with water and dried. The resulting mass is an artificial resin which is insensitive to solvents.

*Example 10*

0.5 part of the dry preparation prepared as described in Example 1 is mixed with a mixture of 1 part of butanol and 0.25 part of cyclohexanone, and the whole is heated at 95–100° C. until dissolution is complete and a highly viscous colorless liquid is obtained.

In order to recover the pure hydrazone 5 parts of methanol are added, and then the hydrazone is precipitated with a small amount of water. The solvents are removed from the resin by decanting or centrifuging. Depending on the purpose for which it is to be used the resin may be dried or dissolved in butanol with slight heating. If necessary, the product can be further purified by dilution with methanol and precipitation with water.

*Example 11*

In order to prepare the hydrazone with methyl isobutyl ketone or acetoacetic acid ethyl ester the procedure may be analogous to that described in Example 10, but by using, instead of cyclohexanone, a corresponding quantity of methyl isobutyl ketone or acetoacetic acid ethyl ester. For separating and purifying the product the procedure may be as described in Example 10.

Resins obtainable in this manner are suitable as heat hardenable lacquer resins of high adhesive power and can be used with advantage as additions to melamine-formaldehye or urea-formaldehyde lacquer resins.

*Example 12*

500 parts of the copolymer containing hydrazide groups prepared as described in Example 1 are mixed with 445 parts of acetone in a kneading apparatus of the Pfleiderer type. After kneading for about 5 minutes, 55 parts of water are added. Hydrazone formation takes place with the spontaneous evolution of heat and a highly viscous solution is gradually formed. After kneading the mixture for ½ hour, a further 666 parts of butanol are added and kneading is continued for a further 5 hours at the ordinary temperature. There are obtained about 1600 parts of a clear practically colorless solution of low viscosity, which contains 30 percent of the copolymer reacted with acetone. The solution may be diluted with water as desired, whereby a slightly opalescent turbidity is formed. The addition of an organic acid such as acetic acid or formic acid or an inorganic acid, such as hydrochloric acid, or of an organic base such as triethylamine, ethylene diamine or an inorganic base such as ammonia, caustic soda solution or caustic potash solution, causes the turbidity to disappear, whereupon the water-clear solution undergoes a distinct increase in viscosity.

*Example 13*

A solution of about 10 percent strength of the copolymer containing hydrazide groups described in Example 1, and which has been obtained by dissolving 0.5 part of the copolymer with 0.5 part of butanol and 4 parts of water, is mixed with a concentrated aqueous solution of 0.2 part of N-methyl-diacetone-amine of the formula

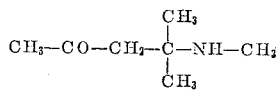

and the whole is heated for a short time at 60° C. in a water bath. There is immediately formed an insoluble condensation product, which separates out in the form of a soft resin in the swollen state. It is washed with water, and if necessary purified by dissolution in acetone and reprecipitation with water. The new hydrazone is insoluble in water, alcohol or acetone. On the addition of hydrochloric acid there is obtained a clear viscous solution of the hydrochloride in water.

*Example 14*

100 parts of the copolymer obtained as described in Example 1 are mixed in a kneading apparatus which is capable of being heated and is provided with a reflux condenser, first with 15 parts of acetone, and 1 part of water. The reaction sets in accompanied by spontaneous heating to about 40° C. and strong swelling, and then further quantities of acetone and water are slowly added until a total of a further 175 parts of acetone and 9 parts of water have been added. By gently heating the mixture at 40–45° C. (internal temperature) the reaction is brought to an end, which is apparent from the fact that the copolymer has dissolved completely. The viscous solution is evaporated to dryness in vacuo at 90° C., and 113 parts of the hydrazone remain behind as residue in the form of a dry substance resembling gelatine. The hydrazone is fairly stable and can be dissolved in the following manner:

30 parts of the hydrazone are first mixed with 35 parts of acetone and 17.5 parts of water. After allowing the product to swell for a short time, 17.5 parts of butanol are added, and the whole is stirred at 60° C. (internal temperature) until dissolution is complete. In this manner there is obtained a syrupy liquid which contains 30 percent of the hydrazone as dry substance.

*Example 15*

2 parts of an aqueous dispersion of 40 percent strength of a copolymer of 80 parts of isobutyl acrylate, 10 parts of acrylonitrile and 10 parts of acrylamide are mixed with 8 parts of the solution of the copolymer containing hydrazide groups which has been prepared as described in Example 2 and adjusted to a solids content of 10 percent. 2.5 parts of an aqueous solution of 20 percent strength of dimethylol-urea are added to the mixture. Films, which are produced from this mixture by applying the mixture to glass plates and drying it at 70° C., become insoluble and non-swellable in water, acetone or trichlorethylene, after being heated for a short time, at 140° C. for 3 minutes. The films also have a high adhesive power.

*Example 16*

Films which are very resistant to water, acetone and trichlorethylene can be prepared as follows:

2 parts of an aqueous dispersion of 40 percent strength of a copolymer of 70 parts of isobutylacrylate, 23 parts of acrylonitrile, 5 parts of acrylamide and 2 parts of acrylic acid are mixed with 8 parts of a solution of 10 percent strength of the copolymer containing hydrazide groups prepared in the manner analogous to that described in Example 2 and with 5 parts of an aqueous solution of 10 percent strength of dimethylol-urea. The mixture is brushed on to glass plates and then thoroughly dried at 70–80° C.

*Example 17*

68 parts of an aqueous dispersion of 40 percent strength of a copolymer of 70 parts of isobutyl acrylate, 23 parts of acrylonitrile, 5 parts of acrylamide and 2 parts of acrylic acid are neutralized with a concentrated aqueous solution of ammonia while stirring. Into the resulting thickened emulsion there are stirred 2 parts of castor oil and 20 parts of a solution of 10 percent strength of the hydrazone prepared in a manner analogous to that described in Example 12 and diluted with water. The mixture is finally mixed with the aid of a mill with 20 parts of a finely divided iron oxide pigment.

The mixture is very suitable as a colored paste for covering buffed leather.

For covering leather 200 parts of the above color paste are stirred with 800 parts of water. The fine color suspension is applied to buffed calf box leather by plushing, subsequent pressing and spraying, and, after being dried, the leather is sprayed with an aqueous solution of formaldehyde of 10 percent strength to cause fixation. The treated leather is finally pressed at 80° C. under 120 atomspheres pressure.

The leather so covered is distinguished by its very fine grain formation. The covering layer has a very good fastness to wet rubbing.

*Example 18*

5 parts of a solution of about 75 percent strength of a methylol-melamine butyl ether in butanol are mixed with 5 parts of a solution of 10 percent strength of the reaction product of acetone with the copolymer containing hydrazide groups, obtained as described in Example 1, in butanol and acetone (1:1 parts by volume), while stirring. The solution is dried on glass plates to form glossy colorless coatings, which become completely dry after being heated for 10 minutes at 140° C.

A test carried out in a similar manner with the methylolmelamine butyl ether alone, gave, after hardening the coating for 10 minutes at 140° C., a film which was still not completely non-tacky, was less hard and had a poor adhesion to glass.

*Example 19*

33.3 parts of the solution of 30 percent strength of the hydrazone obtained as described in Example 12 are mixed with 56.7 parts of water. 10 parts of stearic acid hydrazide are then added in portions, and the whole is thoroughly emulsified at 50° C. There is obtained a finely dispersed viscous emulsion, which, after the addition of a small amount of 2 N-formic acid, can easily be mixed with any desired quantity of water.

The diluted emulsion, after being mixed with dimethylol-urea, is suitable for imparting a hydrophobic effect fast to washing to fabrics of cotton or viscose. If desired, there may also be added a water-soluble aluminum salt.

*Example 20*

30 parts of the solution of 30 percent strength of the hydrazone obtained as described in Example 12 are mixed with 4.5 parts of dimethylol-urea and 200 parts of water. A cotton fabric is impregnated on a foulard with the resulting solution, and the fabric is then squeezed until it has an increase in weight of 80–100 percent. After being dried at 60–70° C., the fabric is heated for 5 minutes at 130° C., and in this manner there is obtained a full dressing which is fast to washing and has a pleasant feel.

*Example 21*

30 parts of the solution of 30 percent strength of the hydrazone obtained as described in Example 12 are mixed with 9 parts of an aqueous emulsion of 50 percent strength of a methylol-melamine butyl ether, while stirring, and the mixture is then diluted with 200 parts of water. The mixture is weakly acidified with 2 N-formic acid, and used for dressing a fabric of cotton or viscose. After being thoroughly dried at 80–100° C. the fabric has a full dressing which is fast to washing, a reduced swelling capacity and an improved resistance to scouring.

*Example 22*

200 parts of a solution of 46.8 percent strength of the copolymer of 20 parts of dodecyl methacrylate and 80 parts of n-butyl acrylate in n-butanol are mixed with 45.75 parts of hydrazine hydrate of 99 percent purity, and the mixture is heated for 24 hours in an oil bath having a temperature of 130° C., while vigorously stirring. The reaction temperature is initially 115–117° C. and falls during the reaction to 103° C. There is obtained a gelatinous reaction product, which is ground with 250 parts by volume of methanol. After filtering the mixture with suction through a cloth filter, suspending the filter residue twice in 200 parts by volume of methanol on each occasion and again filtering it off with suction, the residue is dried over calcium chloride in a vacuum desiccator. There are obtained about 102 parts of the copolymer containing hydrazide groups in the form of a colorless rubber-like material. By analysis the copolymer has a nitrogen content of about 7.5 percent.

*Example 23*

A mixture of 72.2 parts of hydrazine hydrate of 99 percent purity and 223 parts of a solution of 50 percent strength of a copolymer of 52 parts of styrene and 64 parts of n-butyl acrylate in n-butanol is heated, while stirring, for 4½ hours at 106–112° C. (bath temperature 130° C.) and then for a further 2 hours at 109–110° C. (bath temperature 140° C.). The reaction is accompanied by a progressively increasing turbidity and precipitation of the reaction product in the form of a thick viscous mass. After cooling the mixture, the supernatant butanol is poured off, and the residue is stirred with 200 parts of ethylene glycol monoethyl ether, whereupon the residue dissolves. The resin is precipitated from the solution by the addition of 200 parts of water and is separated off. The resin is thoroughly washed in a kneading apparatus with water, then disintegrated into small pieces, and dried in a vacuum pot at 50–55° C. About 70 parts of a colorless plastic copolymer are obtained, which by analysis has a nitrogen content of about 2 percent.

*Example 24*

200 parts of a solution of 50 percent strength of a copolymer of 10 parts of styrene and 90 parts of n-butyl acrylate in 100 parts of n-butanol are mixed with 53 parts of hydrazine hydrate of 99 percent strength, and the mixture is heated for 8 hours at 105–110° C. (bath temperature 130° C.), while vigorously stirring. The viscous turbid reaction product is cooled and introduced, while stirring, into 400 parts by volume of methanol, whereupon the copolymer containing hydrazide groups separates out in the form of a white powder. It is filtered off with suction through a cloth filter and suspended twice in 200 parts by volume of methanol on each occasion, then filtered off with suction and dried over calcium chloride in a vacuum desiccator. There are obtained about 50 parts of the copolymer in the form of a white hard coarsely granular powder. By analysis it has a nitrogen content of 16 percent.

*Example 25*

200 parts of a solution of 47.7 percent strength of the copolymer of 20 parts of octadecyl vinyl ether and 80 parts of n-butyl acrylate in n-butanol are mixed with 45.75 parts of hydrazine hydrate of 99 percent strength, while stirring, and the mixture is heated for 8 hours at 103–108° C. (bath temperature 130° C.). When the reaction is finished, the reaction product has separated for the greater part in the form of a viscous gelatinous mass in the butanol. The supernatant butanol is poured off, and the soft mass which remains behind is disintegrated in a grinding apparatus in 250 parts by volume of methanol. After filtering off the material through a cloth filter the mass, which is now pulverulent, is suspended in 250 parts by volume of methanol, the mixture is filtered with suction and the filter residue is finally dried in vacuo over calcium chloride. There are obtained 80 parts of the copolymer containing hydrazide groups in the form of a white powder. By analysis it has a nitrogen content of 15 percent.

*Example 26*

50 parts of the solution of 30 percent strength of the hydrazone obtained as described in Example 12 are mixed with 85 parts of water and 15 parts of an epoxy resin, which has been obtained by reacting one molecular proportion of 4:4'-dioxy-diphenyl-dimethyl methane with about 6 molecular proportions of epichlorhydrin in the presence of an aqueous alkali, and the mixture is homogenized at 40° C. in an emulsifying machine.

This emulsion, after the addition thereto of a hardening agent, such as triethylene tetramine, can be used as an adhesive or as a dressing preparation for polyamide, polyester or polyacrylonitrile fibers.

Films produced with the above emulsion harden more rapidly than those produced with an emulsion of the same epoxy resin, but with the use as emulsifying agent for the epoxy resin of the condensation product of one molecular proportion of oleyl alcohol with 200 molecular proportions of ethylene oxide.

What is claimed is:

1. A process for the manufacture of a polymer containing hydrazide groups, which comprises heating hydrazine with a linear additive polymer which contains as sole groups capable of reacting with hydrazine a substantial quantity of carboxylic acid ester groups of a monoethylenically unsaturated aliphatic monocarboxylic acid with 3 to 4 carbon atoms, whereby at least a part of the ester groups are replaced by hydrazide groups and the final product contains, in addition to structural elements containing hydrazide groups, stuctural elements of another copolymerizable ethylenically unsaturated compound.

2. A process for the manufacture of a polymer containing hydrazide groups, which comprises heating hydrazine with a linear additive polymer of an acrylic acid ester, which contains as sole groups capable of reacting with hydrazine a substantial quantity of acrylic acid ester groups, whereby at least a part of the ester groups are replaced by hydrazide groups and the final product contains, in addition to structural elements of acrylic acid hydrazide, structural elements of an acrylic acid ester.

3. A process for the manufacture of a polymer containing hydrazide groups, which comprises heating hydrazine with a linear additive polymer of acrylic acid n-butyl ester, which contains as sole groups capable of reacting with hydrazine a substantial quantity of acrylic acid n-butyl ester groups, whereby at least a part of the ester groups are replaced by hydrazide groups and the final product contains, in addition to structural elements of acrylic acid hydrazide, sturctural elements of an acrylic acid n-butyl ester.

4. A process for the manufacture of a polymer containing hydrazide groups, which comprises heating hydrazine with a linear additive polymer of acrylic acid n-butyl ester, which contains as sole groups capable of reacting with hydrazine a substantial quantity of acrylic acid n-butyl ester groups, to temperatures within the range of about 85° to about 115° C. until about 50 percent of the ester groups present are replaced by hydrazide groups.

5. A process for the manufacture of a polymer containing hydrazide groups, which comprises heating hydrazine with a linear additive copolymer of an acrylic acid ester, which contains as sole groups capable of reacting with hydrazine a substantial quantity of acrylic acid ester groups, whereby at least a part of the ester groups are replaced by hydrazide groups and the final product contains, in addition to structural elements of acrylic acid hydrazide, structural elements of another copolymerizable ethylenically unsaturated compound.

6. A process for the manufacture of a copolymer containing hydrazide groups, which comprises heating a linear additive copolymer of a substantial amount of acrylic acid n-butyl ester and styrene with hydrazine to temperatures within the range of about 85° C. to about 115° C., whereby a part of the ester groups are replaced by hydrazide groups.

7. A method for preparing linear terpolymer of 10 percent styrene, about 45 percent acrylic acid n-butyl ester and about 45 percent acrylic acid hydrazide which comprises heating at a temperature within the range from about 85° C. to about 115° C. (*a*) a copolymer of 10 percent of styrene and 90 percent of acrylic acid n-butyl ester with (*b*) hydrazine.

8. A copolymer which contains as structural elements a hydrazide of a copolymerizable monoethylenically unsaturated aliphatic monocarboxylic acid with 3 to 4 carbon atoms and another copolymerizable ethylenically unsaturated compound, which copolymer has been obtained by heating hydrazine with a linear additive polymer which contains as sole groups capable of reacting with hydrazine a substantial quantity of carboxylic acid ester groups of a monoethylenically unsaturated aliphatic monocarboxylic acid with 3 to 4 carbon atoms, whereby a part of the ester groups are replaced by hydrazide groups, and the final product contains, in addition to structural elements containing hydrazide groups, structural elements of another copolymerizable ethylenically unsaturated compound.

9. A copolymer which contains as structural elements acrylic acid hydrazide groups and acrylic acid n-butyl ester groups, which copolymer has been obtained by heating hydrazine with a linear additive polymer, which contains as sole groups capable of reacting with hydrazine a substantial quantity of acrylic acid n-butyl ester, to temperatures within the range of about 85° C. to about 115° C. until about 50 percent of the ester groups present are replaced by hydrazide groups.

10. A linear terpolymer of about 10 percent styrene groups, about 45 percent acrylic acid n-butyl ester groups and about 45 percent acrylic acid hydrazide groups.

11. A hydrazone of (1) a saturated monocarbonyl-compound containing at least two carbon atoms and (2) a linear additive copolymer which copolymer contains as structural elements (a) a substantial amount of a hydrazide of a copolymerizable mono-ethylenically unsaturated aliphatic acid with 3 to 4 carbon atoms and (b) another copolymerizable ethylenically unsaturated compound.

12. A hydrazone of (1) a saturated aliphatic monoketone and (2) a linear additive copolymer which copolymer contains as structural elements acrylic acid hydrazide groups and acrylic acid ester groups.

13. A hydrazone of (1) a saturated dialkyl ketone and (2) a linear additive copolymer which copolymer contains as structural elements acrylic acid hydrazide groups and acrylic acid n-butyl ester groups.

14. A hydrazone of (1) acetone and (2) a linear additive copolymer which copolymer contains as structural elements 50 percent of acrylic acid hydrazide groups and 50 percent of acrylic acid n-butyl ester groups.

15. A hydrazone of (1) iso butyl methyl ketone and (2) a linear additive copolymer which copolymer contains as structural elements 50 percent of acrylic acid hydrazide groups and 50 percent of acrylic acid n-butyl ester groups.

16. A hydrazone of (1) cyclohexanone and (2) a linear additive copolymer which copolymer contains as structural elements 50 percent of acrylic acid hydrazide groups and 50 percent of acrylic acid n-butyl ester groups.

17. A hydrazone of (1) N-methyl diacetone amine and (2) a linear additive copolymer which copolymer contains as structural elements 50 percent of acrylic acid hydrazide groups and 50 percent of acrylic acid n-butyl ester groups.

References Cited in the file of this patent

UNITED STATES PATENTS

| | | |
|---|---|---|
| 2,146,210 | Graves | Feb. 7, 1939 |
| 2,497,526 | Arnold | Feb. 14, 1950 |
| 2,715,116 | Hutchison | Aug. 9, 1955 |
| 2,764,570 | Kowolik et al. | Sept. 25, 1956 |
| 2,914,510 | Contois | Nov. 24, 1959 |

OTHER REFERENCES

Degering: An Outline of Organic Nitrogen Compounds, University Litho. (1950), pages 382–389. (Copy in Sci. Lib.)

Whitmore: Organic Chem., Van Nostrand & Co., 2nd edition (1951), reprinted July 1955, page 299. (Copy in Sci. Lib.)

Yasuda: Journal Society, Textile & Cellulose Ind., Japan, vol. 9 (1953), pages 555–8, abstracted in Chem. Abst., vol. 48, p. 1690a.